(12) United States Patent
Bik et al.

(10) Patent No.: US 6,698,995 B1
(45) Date of Patent: Mar. 2, 2004

(54) HITCH MOUNTED REFUSE CONTAINER TRANSPORT DEVICE

(76) Inventors: Russell J. Bik, 1939 Corbett Highlands Pl., Arroyo Grande, CA (US) 93420; William J. Kelley, 1952 Corbett Highlands Pl., Arroyo Grande, CA (US) 93420

( * ) Notice: Subject to any disclaimer, the term of this patent is extended or adjusted under 35 U.S.C. 154(b) by 0 days.

(21) Appl. No.: 10/302,168

(22) Filed: Nov. 21, 2002

(51) Int. Cl.[7] ................................. B60R 9/00
(52) U.S. Cl. ................. 414/462; 224/519; 224/521; 224/547
(58) Field of Search .............. 414/462; 224/519, 224/521, 543, 545, 547

(56) References Cited

U.S. PATENT DOCUMENTS

| | | | | |
|---|---|---|---|---|
| 3,376,986 A | * | 4/1968 | Farber | 414/446 |
| 3,409,103 A | * | 11/1968 | Cameron | 180/127 |
| 4,381,069 A | * | 4/1983 | Kreck | 224/502 |
| 4,400,129 A | * | 8/1983 | Eisenberg et al. | 414/462 |
| 4,932,829 A | * | 6/1990 | Miller | 414/462 |
| 5,029,740 A | * | 7/1991 | Cox | 224/484 |
| 5,106,002 A | * | 4/1992 | Smith et al. | 224/506 |
| 5,211,526 A | * | 5/1993 | Robinette | 414/550 |
| 5,221,173 A | * | 6/1993 | Barnes | 414/346 |
| 5,366,338 A | * | 11/1994 | Mortensen | 414/563 |
| 5,449,101 A | * | 9/1995 | Van Dusen | 224/506 |
| 5,738,261 A | * | 4/1998 | Dula | 224/533 |
| 5,826,485 A | | 10/1998 | Bayne et al. | |
| 5,931,362 A | * | 8/1999 | Chimenti | 224/521 |
| 5,961,272 A | * | 10/1999 | Short | 414/462 |
| 6,033,178 A | | 3/2000 | Cummins | |
| 6,039,227 A | * | 3/2000 | Stark | 224/521 |
| 6,164,896 A | | 12/2000 | Cummins | |
| 6,361,264 B1 | | 3/2002 | Guthrie et al. | |
| 6,390,344 B1 | * | 5/2002 | Edgerly | 224/531 |
| 6,401,999 B1 | | 6/2002 | Hehr | |

* cited by examiner

Primary Examiner—Douglas Hess
(74) Attorney, Agent, or Firm—Felix L. Fischer

(57) ABSTRACT

A hitch mountable refuse container transport device has a vertical element supporting a telescoping mount that carries T-bar keys on a horizontal bracket. Each key has a horizontal surface sized to be received within a recessed portion on the refuse container and engage a lip on an upper periphery of the recessed portion. Adjustment of the telescoping mount lifts the containers for transport.

12 Claims, 9 Drawing Sheets

HITCH MOUNTED REFUSE CONTAINER TRANSPORT DEVICE

BACKGROUND OF THE INVENTION

1. Field of the Invention

This invention relates generally to the field of refuse hauling and, more particularly, to a device mountable on a standard trailer hitch for lifting and transporting standardized residential refuse containers.

2. Description of the Related Art

Automation of collection devices for refuse containers has become an essential part of waste management for most locations whether metropolitan, urban or rural. Waste and recycling companies have developed standardized refuse containers that employ an integrated attachment recess and restraining bar. The containers are typically constructed of high impact polyethylene or other plastic. The attachment recess is molded into one side of the container with a horizontal restraining bar mounted in the recess. A vertical tine on a robotic lifting arm mounted to the side of the refuse collection vehicle is inserted into the recess and engages the restraining bar for automatically hoisting the container in an arc to dump the container into the refuse bin on the truck chassis. The use of such containers by waste collection companies is increasing because it speeds the collection process and reduces the chances of back injury to their employees.

To minimize the number of cans for pick up at any residence, and as facilitated by the automated lifting devices on the collection trucks, the containers are frequently of a size larger than can be lifted by an individual when full. In many cases, the containers are massive enough that one person cannot lift them comfortably even when empty. Most containers have integral wheels for maneuvering into position for pick-up and returning to their location for use, however, the wheels are not sufficiently durable or properly positioned for moving the containers any distance. The containers typically incorporate a hinged lid that swings open in the dumping cycle and is opened by hand for inserting refuse into the container. The hinge of the lid normally incorporates one or more handles for tilting the container onto its wheels.

The lack of easy transportability of the containers for the home or business owner is particularly problematic in rural areas where the containers may need to be moved some distance to a main road for collection by the refuse company. Some users tie or employ clamping devices to attach the handles of the container to a vehicle bumper or trailer hitch to roll the container behind a vehicle to and from the collection point. The general lack of serviceability of the wheels for this purpose typically results in premature failure of the wheels or other inconvenient failure or accident with the containers during such transport.

It is therefore desirable to provide a device that engages the existing container-lifting interface for transport of the containers.

SUMMARY OF THE INVENTION

A hitch mountable refuse container transport device incorporates a hitch bar for mounting in a standard hitch receiver on a vehicle. The hitch bar has an upstanding stub at the opposite end from the end inserted into the receiver and a removable vertical element is carried by the stub. The vertical element is secured to the stub at a desired height by aligning one of a plurality of holes vertically spaced in the side of the element with an aperture in the stub and inserting a pin through the aperture and selected hole. The purpose of this adjustment is to compensate for the variability of hitch heights on various vehicles. Similarly, the amount of insertion of the hitch bar into the receiver hitch is adjustable by means of a similar row of aligning apertures secured at the desired amount of insertion using a pin. The purpose of this adjustment is to permit variable amounts of access to the lift when standing between it and the back of the vehicle.

A telescoping mount is received by the vertical element. Vertical movement of the mount is achieved through the use of a lead screw that engages a threaded plane in the lower half of the vertical element. As the lead screw is rotated, the upper half of the telescoping mount extends or retracts. The lead screw is rotated by hand using a crank or, alternatively using an electric motor. Finally, an engagement key is attached to the telescoping mount. The key has a horizontal surface sized to be received within a recessed portion on the refuse container and engage a lip on an upper periphery of the recessed portion. A notch is vertically spaced below the horizontal surface on the key to receive a restraining bar horizontally mounted across the recessed portion. When the can is lifted, its balance is such that the lower end tilts inward toward the lift such that the restraining bar is engaged by the key to make it less likely that the can will bounce off the lift during transport.

BRIEF DESCRIPTION OF THE DRAWINGS

These and other features and advantages of the present invention will be better understood by reference to the following detailed description when considered in connection with the accompanying drawings wherein:

FIG. 4b is a front view of the embodiment of FIG. 4a.

FIG. 4c is a top view of the embodiment of FIG. 4a

DETAILED DESCRIPTION OF THE INVENTION

Figure 1:
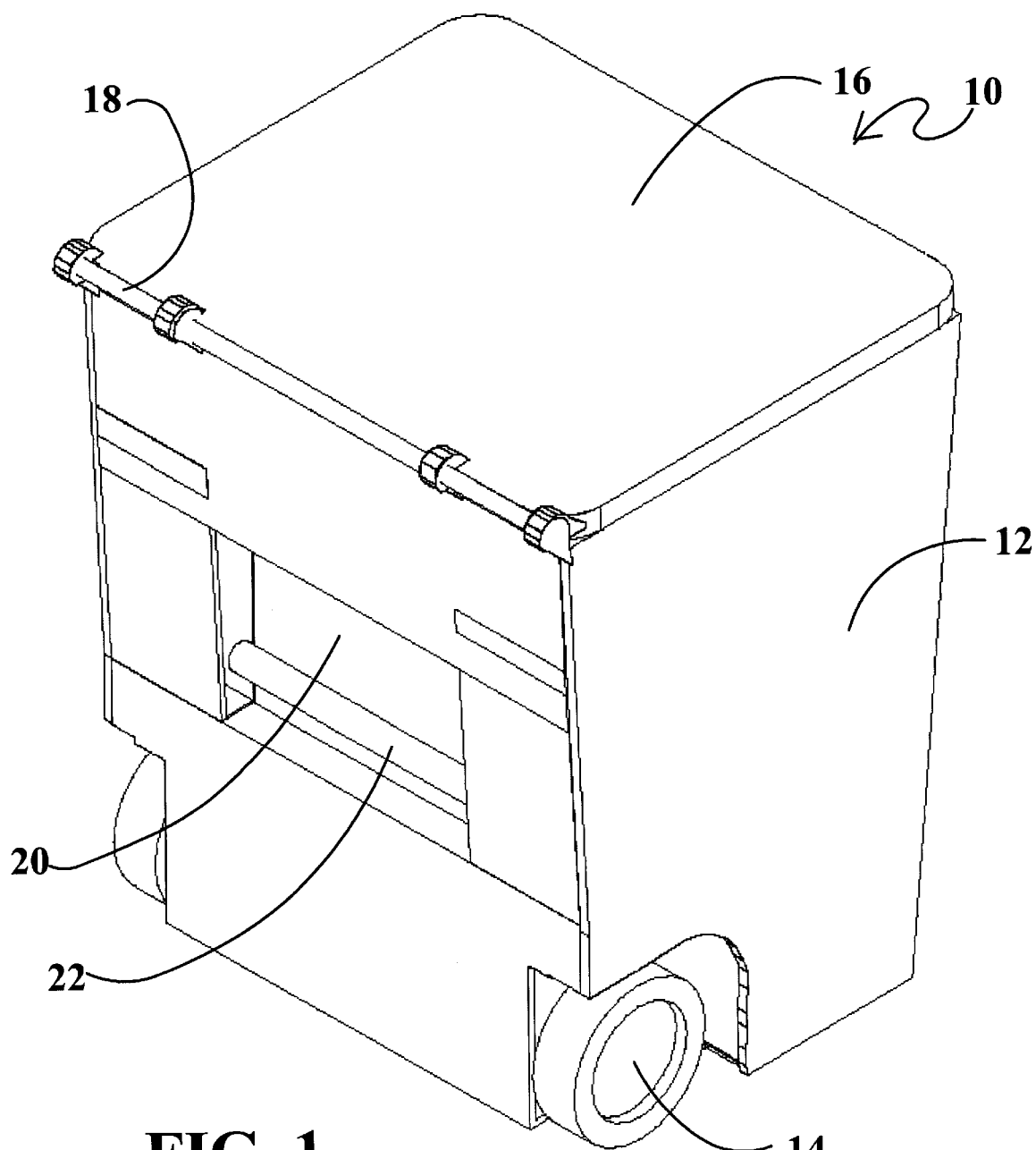
FIG. 1 is a pictorial view of a standard refuse container with which the present invention will be employed.

Turning to the drawings, FIG. 1 shows a refuse container 10 typical of the type to be used with the present invention. The container has a molded body 12 including cutouts to receive wheels 14. A lid 16 is hinged to the body using integral handle hinges 18. A recess 20 in the body is employed for attachment to the automated dumping equipment present on the refuse collection vehicles using a lip along the upper periphery of the recess, as will be described in greater detail subsequently and a restraining bar or molded-in cross piece 22 carried horizontally within the recess.

Figure 2:
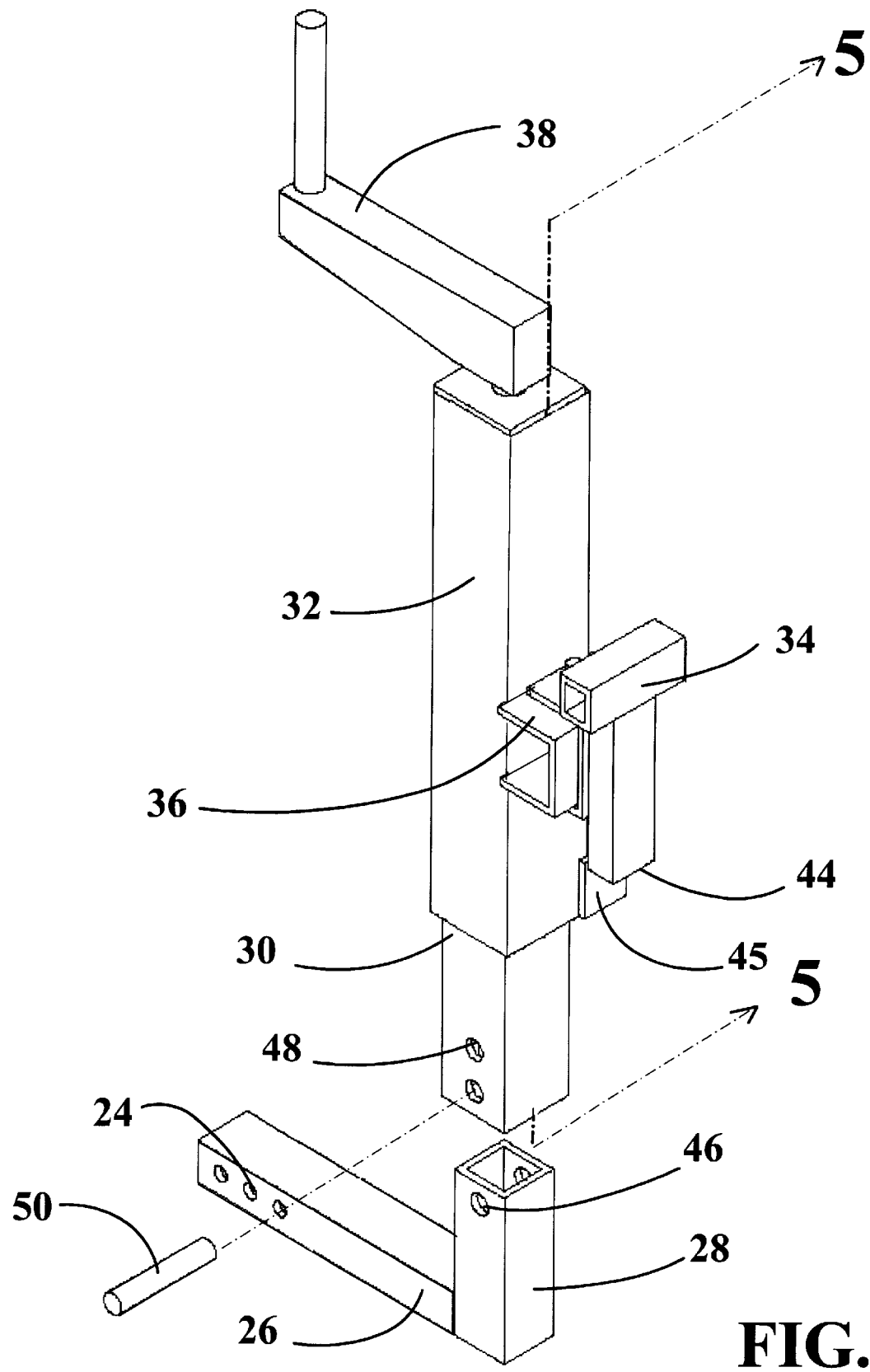
FIG. 2 is an isometric view of a first embodiment of the invention for attaching a single refuse container.

A first embodiment of the present invention is shown in FIG. 2. A hitch bar 24 is provided to be carried by the receiver (not shown) in a standard towing hitch assembly present on many cars, sport utility vehicles and pickup trucks. A row of locking apertures 26 align with mating holes in the receiver for insertion of a pin to lock the hitch bar into the receiver. A stub 28 extends from the hitch bar to carry a vertical element 30 on which a telescoping mount 32 is received. The key to engage the refuse container is a T-bar 34 cantilevered from the telescoping mount by a bracket 36 which spaces the T-bar from the wall of the mount. The telescoping mount is translated along the vertical element using a screw drive, described in greater detail subsequently, actuated by crank 38. The embodiment shown in the drawings employ square or rectangular cross section tube sized for mating elements to be telescopically received in or receive adjacent elements.

Figure 3A:
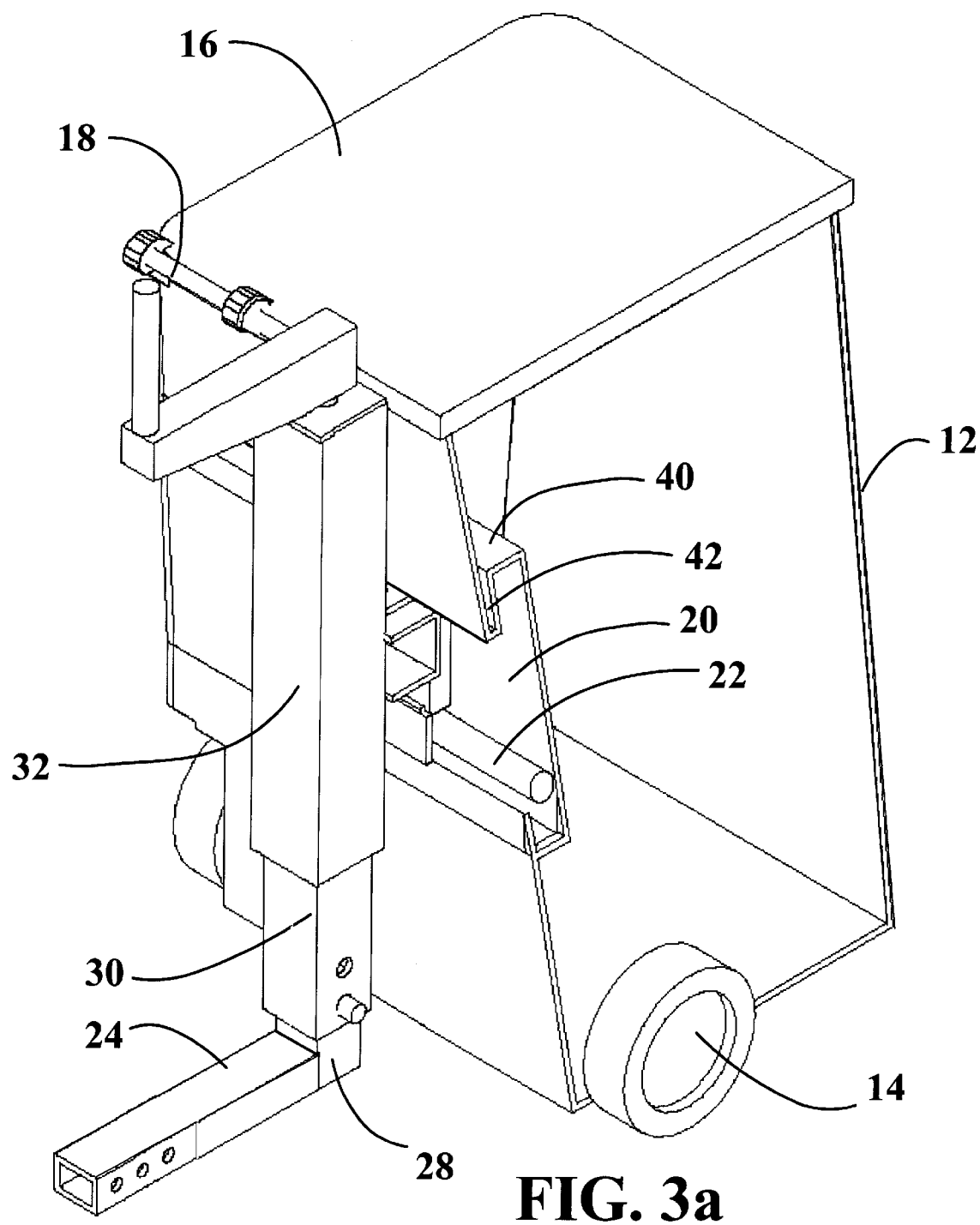
FIG. 3a is an isometric view demonstrating a partial cutaway view showing the "T bar" of the present invention engaged within the recess of the container and secured by the lifting bar.
Figure 3B:
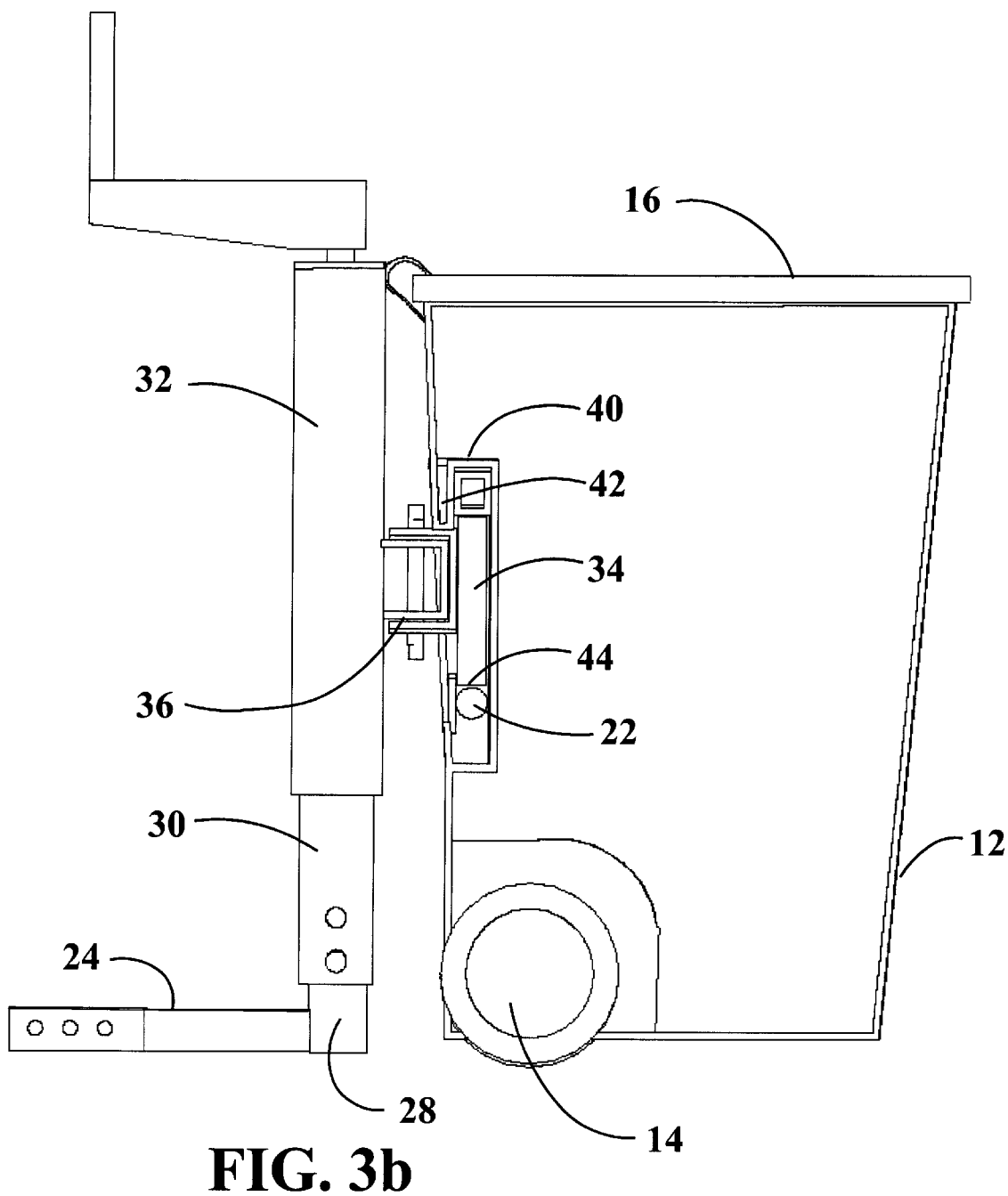
FIG. 3b is a side view of the cutaway of FIG. 3a for additional detail.
Figure 4A:
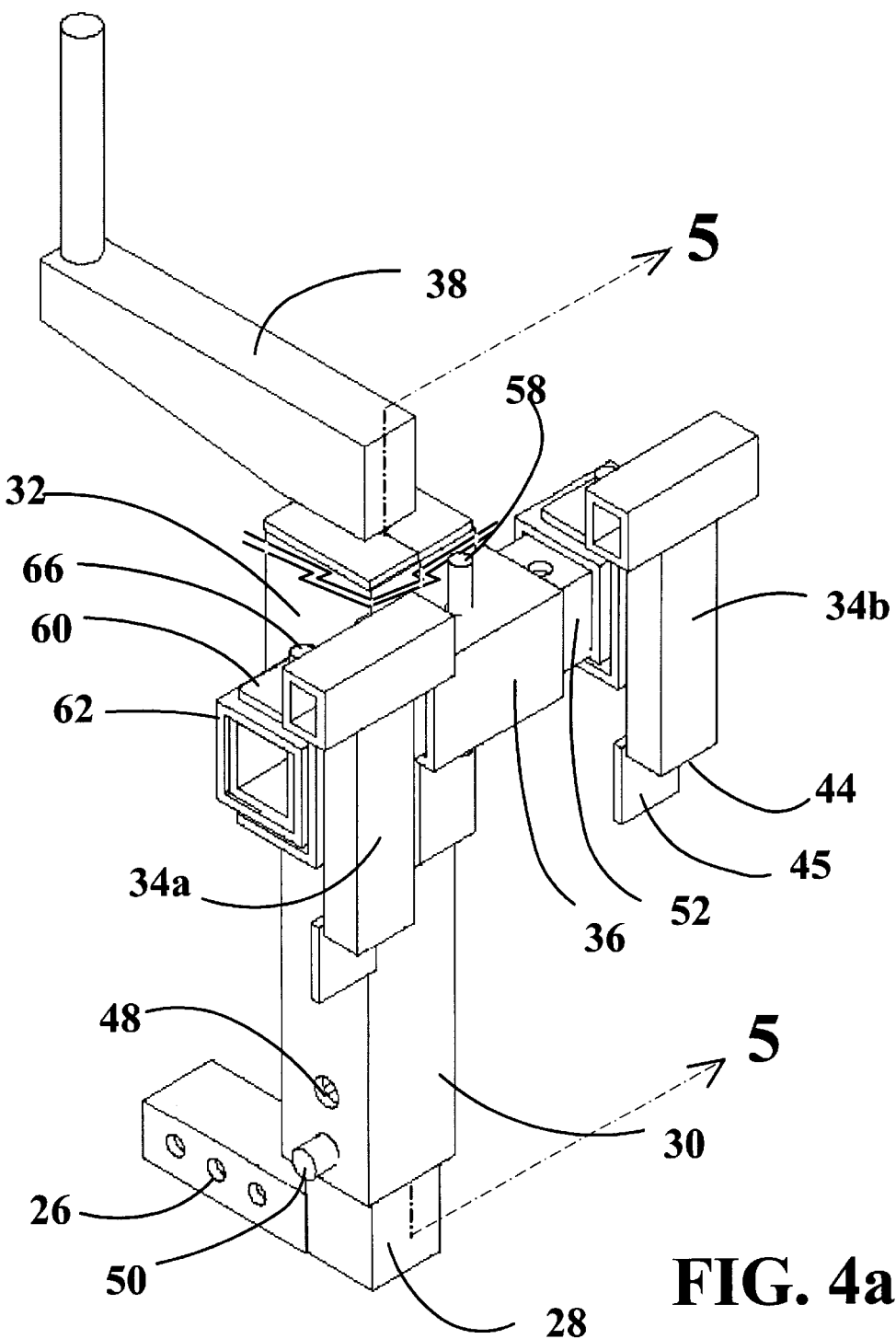
FIG. 4a is an isometric view of a second embodiment of the invention for attaching two refuse containers.

Operation of the invention is best described with respect to FIGS. 3a and 3b, which shows a cutaway of the container to demonstrate the attachment mechanism for the present invention. The top of the T-bar is received within the recess in the container and extends into the channel 40 formed by the lip 42. The telescoping mount is translated upwardly using the screw drive and the T-bar extends fully into the channel. Because of the location of the recess at the back of the container, the balance of the container is such that it will rotate toward the bottom of the T-bar when lifted. The restraining bar 22 is engaged by a notch 44 in the bottom of the T-bar. In the embodiment shown in the drawings, the notch is formed by the bottom of the vertical arm of the T-bar and a plate 45 welded to the back of the vertical arm as best seen in FIGS. 2 and 4a. The restraining bar, urged into the notch by the weight of the container and the rotational moment about the horizontal arm of the T-bar, prevents the container from bouncing vertically and allowing the T-bar to be dislodged from the channel.

Figure 4B:
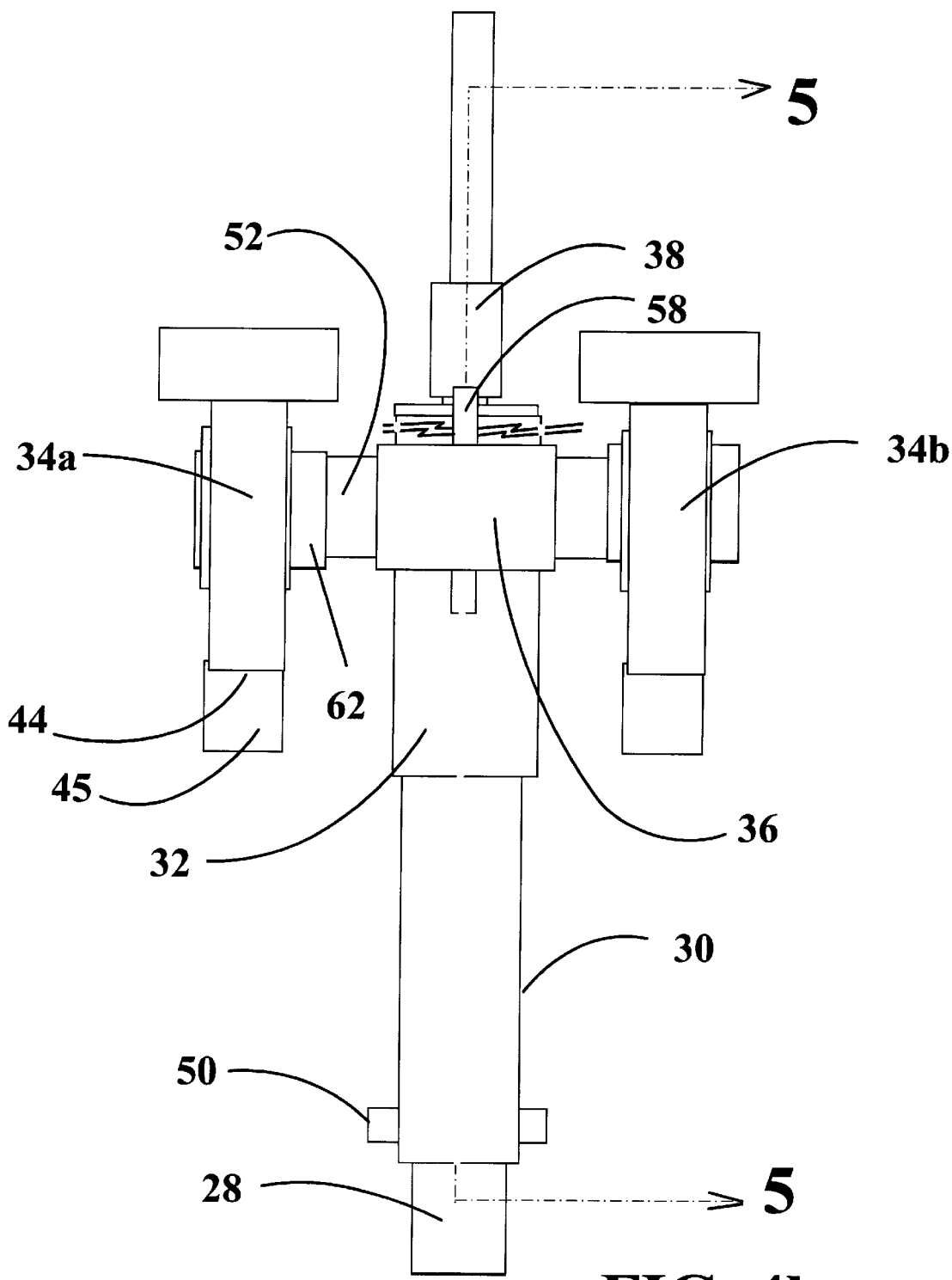
Figure 4C:
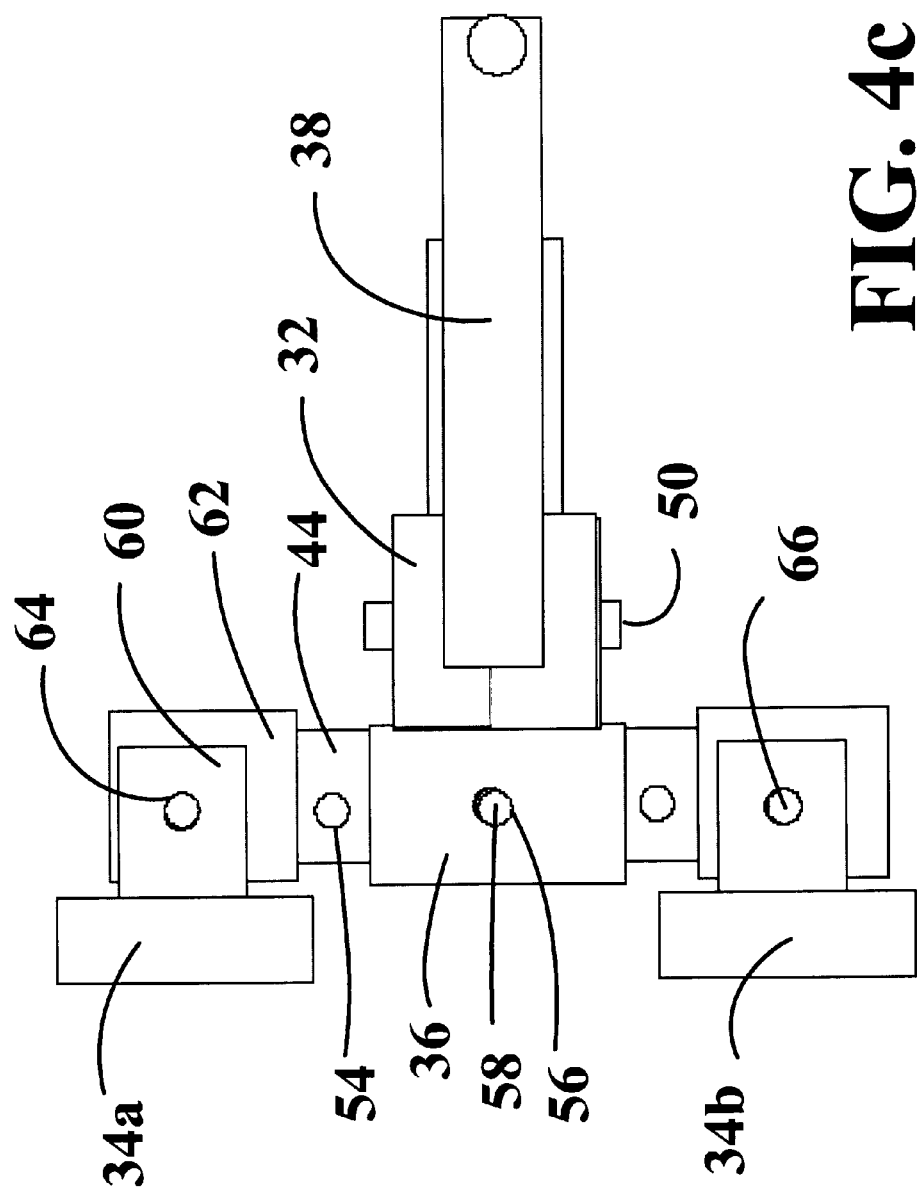

A second embodiment of the invention is shown in FIGS. 4a, 4b and 4c. The telescoping mount 32 has been shortened for convenience in the drawings. As shown, the bracket 36 of the embodiment of FIG. 2 receives a horizontal bar 52 which carries two T-bar assemblies 34a and 34b spaced at each end. This arrangement allows two refuse containers to be lifted and transported simultaneously. Length of the bar for spacing of the T-bar assemblies is determined by the size of the containers to be carried. Positioning apertures 54 in the bar allow horizontal adjustment of the bar when cans of different size are employed or to equalize the torque on the bracket and telescoping mount when cans of significantly differing weight are carried. A locking aperture 56 in bracket 36 allows insertion of a pin or bolt 56 through one of the positioning apertures to fix the horizontal bar in place.

Each T-bar assembly has a channel 60 which is received over a spacer 62. Alignment apertures 64 provide for positioning of the T-bar on the horizontal bar and spacer with a pin or bolt 66 inserted to fix the T-bar in place. Operation of this embodiment is comparable to that described for the first embodiment with the channel of each refuse container being aligned over the horizontal arm of one T-bar. Upon translation of the telescoping mount upward by turning of the crank to engage the screw drive, the horizontal bar of each T-bar is fully engaged within the channel and the restraining bar on the container rotates into engagement with the notch at the base of the vertical arm of each T-bar. For the embodiments shown, the spacer provides a common dimension for the T-bar channel to allow attachment directly to the bracket 36 as shown in FIG. 2 or to the horizontal bar for the two container arrangements shown in FIG. 4a. A third T-bar can be carried on the bracket with the horizontal bar in place to allow carrying three containers, if desired.

Each of the described embodiments in FIGS. 2 and 4a–c incorporate a plurality of engagement holes 48 vertically spaced along the vertical element for selective alignment with aperture 46 in the stub for adjustment. Mounting the vertical element at the different engagement holes using a locking pin 50 allows the telescoping mount to be grossly positioned for varying hitch receiver heights and refuse container sizes to reduce the travel required for the telescoping mount translation mechanism. In an equivalent embodiment, the plurality of holes is alternatively placed in the stub with a single aperture in the vertical element. Positioning of a similar mounting pin (not shown) through the receiver hitch and into one of the row of holes 26 in the hitch bar permits access to the crank from a location between the refuse container and back of the vehicle when the container is too large for the user to reach the crack by reaching over the container.

Figure 5:
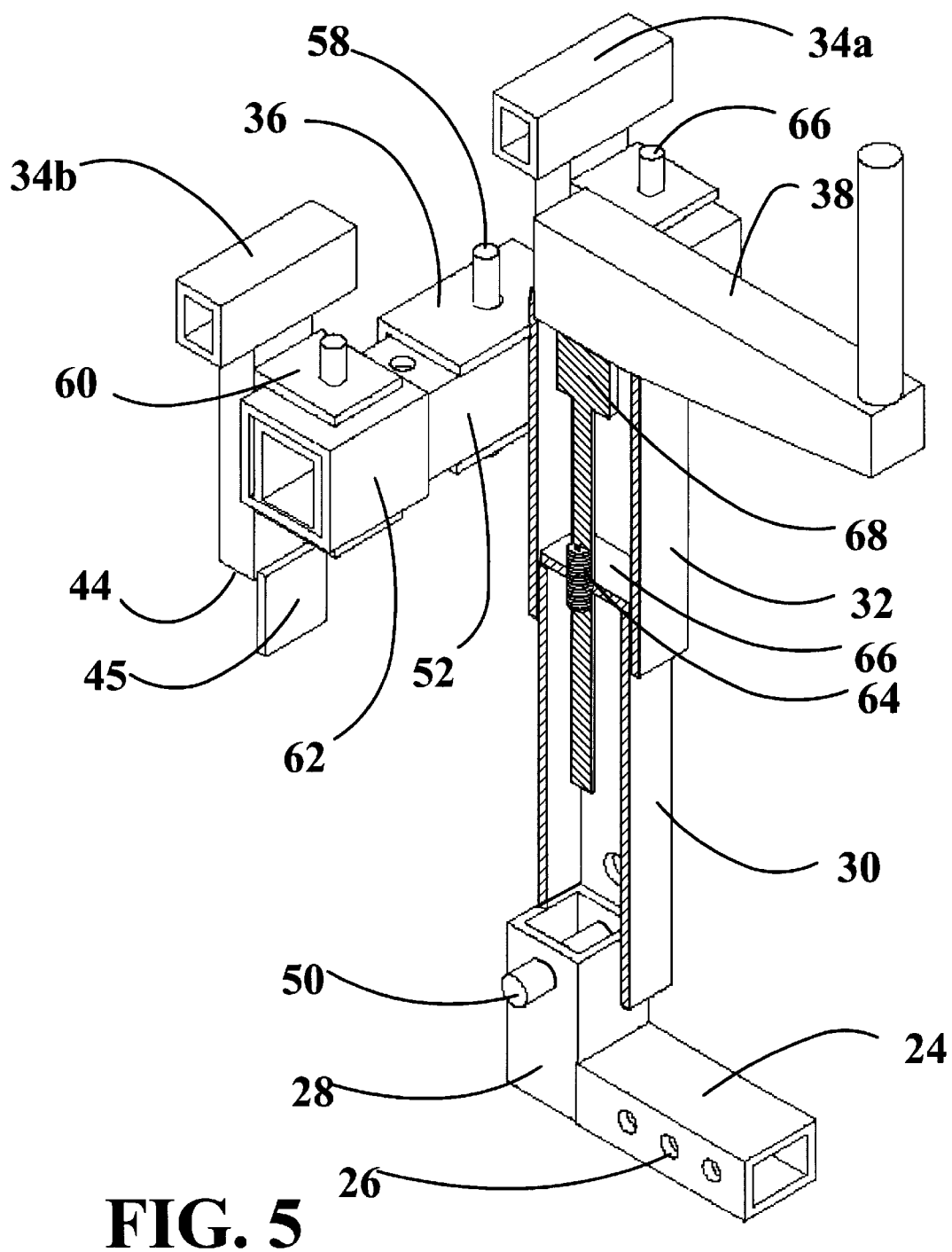
FIG. 5 is a sectional view of the operating mechanism for the embodiments of FIGS. 2 and 4a; and, FIG. 6 is partial sectional view of an alternative embodiment employing a motorized drive.

FIG. 5 shows a first embodiment of the telescoping mount translation mechanism for the invention as shown in FIGS. 2 and 4a. The telescoping mount 32 (which is again shown in shortened form) incorporates a lead screw 64 rotated by crank 38 which is engaged by threaded receiver 66 rigidly held in the vertical element. A flanged cap 68 restrains the lead screw within the telescoping mount while allowing rotational motion. Those skilled in the art will recognize alternative bearing arrangements for the lead screw attachment to the telescoping mount.

Figure 6:
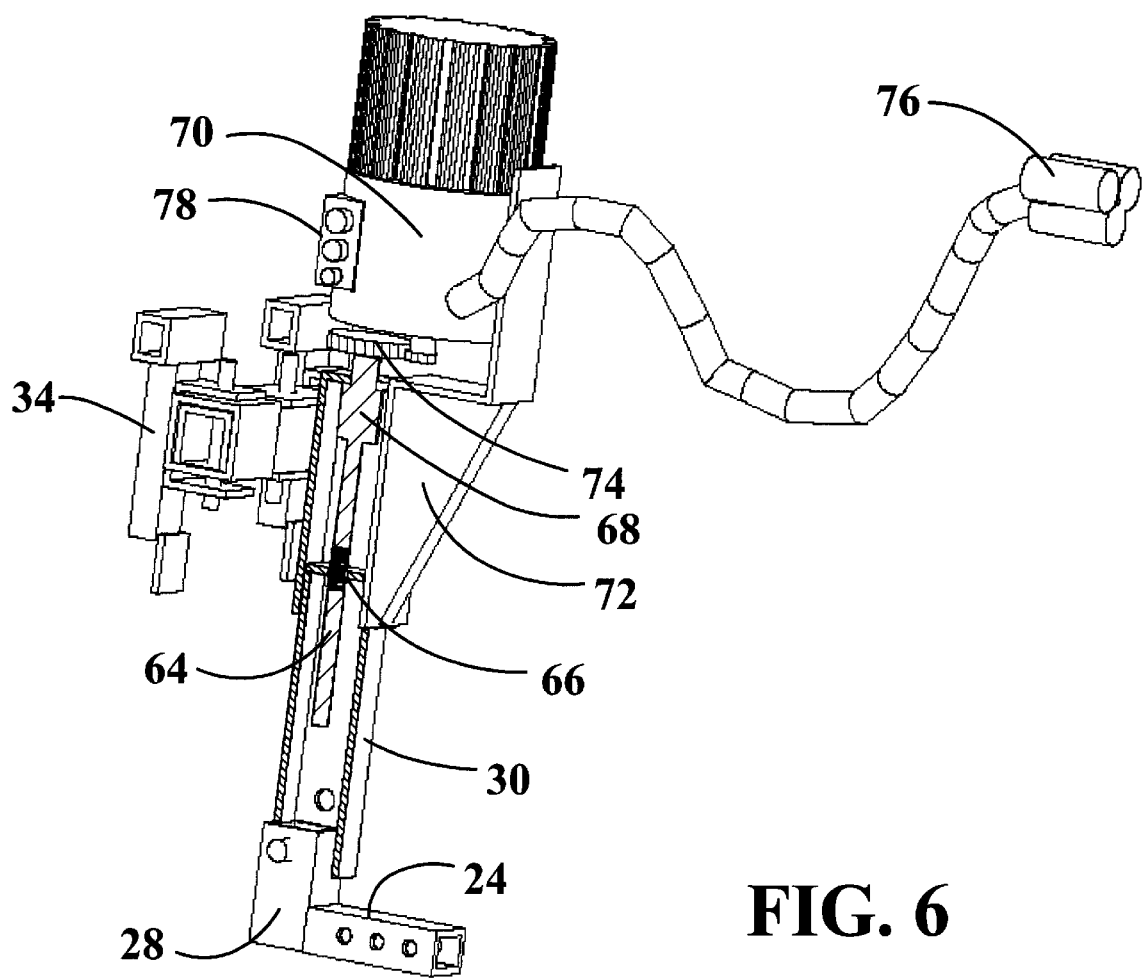

An alternative embodiment employing a motorized drive for the lead screw is shown in FIG. 6. A reversible electric motor 70 is mounted to a step 72 extending from the telescoping mount. Mating gears 74 engage the motor to the lead screw for operation. Power for the motor is obtained using a standard trailer lights/accessory plug 76 or alternative wiring to the vehicle electrical system. A directional control switch 78 allows the user to raise or lower the telescoping mount.

Having now described the invention in detail as required by the patent statutes, those skilled in the art will recognize modifications and substitutions to the specific embodiments disclosed herein. Such modifications are within the scope and intent of the present invention as defined in the following claims.

What is claimed is:

1. A hitch mountable refuse container transport device comprising:
   a hitch bar for mounting in a standard hitch receiver on a vehicle, the hitch bar having an upstanding stub at an end distal from the receiver;
   a vertical element removably carried by the stub;
   means for securing the vertical element to the stub;
   a telescoping mount received by the vertical element;
   a lead screw operably engaging the vertical element and telescoping mount for vertical translation of the telescoping mount;
   means for rotating the lead screw; and
   an engagement key attached to the telescoping mount and having a horizontal surface sized to be received within a recessed portion on the refuse container and engage a lip on an upper periphery of the recessed portion and a notch vertically spaced below the horizontal surface to receive a restraining bar horizontally mounted across the recessed portion.

2. A hitch mountable refuse container transport device as defined in claim 1 wherein the engagement key comprises a T-bar attached to the telescoping mount, the T-bar having a horizontal bar sized to be received within a recessed portion on the refuse container and engage a lip on an upper periphery of the recessed portion, the T-bar further having a vertical bar with a notch at its base to receive a restraining bar horizontally mounted across the recessed portion.

3. A hitch mountable refuse container transport device as defined in claim 1 wherein the vertical element comprises a tube received over the stub and the stub has an aperture in a side wall, wherein the vertical element has a plurality of holes vertically spaced for selective alignment with the aperture on the stub and wherein said means for securing the vertical element comprises a pin insertable through a selected one of the plurality of holes and the aperture into in the stub to secure the vertical element at a desired height.

4. A hitch mountable refuse container transport device as defined in claim 1 wherein the means for rotating the lead screw comprises a hand crank attached to a first end of the lead screw.

5. A hitch mountable refuse container transport device as defined in claim 1 wherein the means for rotating the lead screw comprises a reversible electric motor attached to the telescoping mount and means for attaching the electric motor to the lead screw, and further comprising:
   means for providing power to the electric motor and
   means for controlling the electric motor.

6. A hitch mountable refuse container transport device as defined in claim 5 wherein the means for attaching the electric motor to the lead screw comprises a gear set.

7. A hitch mountable refuse container transport device comprising:
   a hitch bar for mounting in a standard hitch receiver on a vehicle, the hitch bar having an upstanding stub at an end distal from the receiver;
   a vertical element removably carried by the stub;
   means for securing the vertical element to the stub;
   a telescoping mount received by the vertical element;
   a lead screw operably engaging the vertical element and telescoping mount for vertical translation of the telescoping mount;
   means for rotating the lead screw;
   at least one engagement key removably secured to the telescoping mount and having a horizontal surface sized to be received within a recessed portion on the refuse container and engage a lip on an upper periphery of the recessed portion and a notch vertically spaced below the horizontal surface to receive a restraining bar horizontally mounted across the recessed portion; and
   means for securing the engagement key to the telescoping mount.

8. A hitch mountable refuse container transport device as defined in claim 7 wherein the means for securing the at least one engagement key to the telescoping mount comprises a rectangular bracket horizontally attached to the telescoping mount and a channel sized to be received over the rectangular bracket attached to the engagement key.

9. A hitch mountable refuse container transport device as defined in claim 8 wherein the rectangular bracket incorporates an aperture and further comprising a horizontal bar received within the rectangular bracket and having a plurality of apertures spaced for selective alignment with an aperture in the rectangular bracket to laterally position the horizontal bar,
   a pin receivable through the aperture in the bracket and the selected aperture in the bar to prevent lateral movement of the bar,
   a second engagement key, the engagement key and the second engagement key carried in spaced relation on the horizontal bar for transportation of two refuse containers simultaneously; and
   means for mounting the engagement key and the second engagement key to the horizontal bar.

10. A hitch mountable refuse container transport device as defined in claim 9 wherein the means for mounting comprises;
   a spacer received over the bar and having an aperture, the channel on the engagement key received over the spacer and having an aperture for alignment with the aperture in the spacer and a selected one of the apertures in the horizontal bar; and
   a pin inserted through the apertures in the channel and spacer and the selected one of the apertures in the horizontal bar.

11. A hitch mountable refuse container transport device comprising:
   a hitch bar for mounting in a standard hitch receiver on a vehicle, the hitch bar having an upstanding stub at an end distal from the receiver;
   a vertical element removably carried by the stub;
   means for securing the vertical element to the stub;
   a telescoping mount received by the vertical element;
   a lead screw operably engaging the vertical element and telescoping mount for vertical translation of the telescoping mount;
   means for rotating the lead screw;
   two engagement keys having a horizontal surface sized to be received within a recessed portion on the refuse container and engage a lip on an upper periphery of the recessed portion and a notch vertically spaced below the horizontal surface to receive a restraining bar horizontally mounted across the recessed portion, said engagement keys removably secured proximate each end of a horizontal rectangular bar and;
   a rectangular bracket attached to the telescoping mount and sized to removably receive the rectangular bar.

12. A hitch mountable refuse container transport device as defined in claim 11 further comprising a single engagement key having a channel attached thereto, the channel sized to be removably received over the rectangular bracket.

* * * * *